United States Patent [19]

Akazawa

[11] Patent Number: 4,747,733

[45] Date of Patent: May 31, 1988

[54] ELECTRIC DRILL'S CHUCK KEY HOLDING DEVICE

[75] Inventor: Shumi Akazawa, Hiroshima, Japan

[73] Assignee: Ryobi Ltd., Hiroshima, Japan

[21] Appl. No.: 10,599

[22] Filed: Feb. 3, 1987

[30] Foreign Application Priority Data

Feb. 3, 1986 [JP] Japan .............................. 61-14691[U]

[51] Int. Cl.$^4$ .............................................. B23B 45/00
[52] U.S. Cl. ................... 408/241 R; 279/1 K
[58] Field of Search ........................ 408/241; 279/1 K; 81/16

[56] References Cited

U.S. PATENT DOCUMENTS

| | | | |
|---|---|---|---|
| 1,647,396 | 11/1927 | Decker | 408/241 |
| 1,821,436 | 9/1931 | Holloway | 408/241 |
| 3,348,432 | 10/1967 | Kieffer, III | 408/241 |
| 4,032,160 | 6/1977 | Karasa et al. | 279/1 K |
| 4,477,213 | 10/1984 | Nelson et al. | 408/241 R |

FOREIGN PATENT DOCUMENTS

| | | | |
|---|---|---|---|
| 2302164 | 9/1976 | France | 408/241 |
| 462975 | 3/1937 | United Kingdom | 279/1 K |

Primary Examiner—Gil Weidenfeld
Assistant Examiner—D. W. Howell
Attorney, Agent, or Firm—Sughrue, Mion, Zinn, Macpeak & Seas

[57] ABSTRACT

An electric drill's chuck key holding device is made up of an L-shaped chuck key receiving groove which comprises a first recess formed across the upper junction of the two half-housings of the drill body, and a second recess extended from the first recess in such a manner that it is perpendicular to the first recess. The two recesses receive an L-shaped chuck key. The first and second recesses have rubber members in such a manner that the rubber members protrude therein, thereby to positively hold the chuck key in the L-shaped chuck key receiving groove.

6 Claims, 3 Drawing Sheets

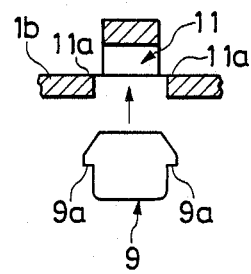
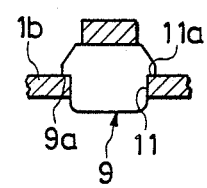
FIG. 5(a)   FIG. 5(b)
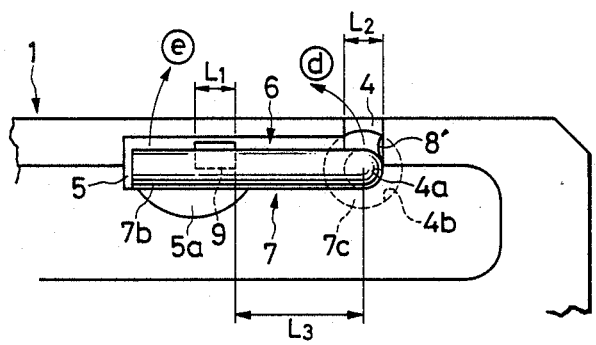
FIG. 6
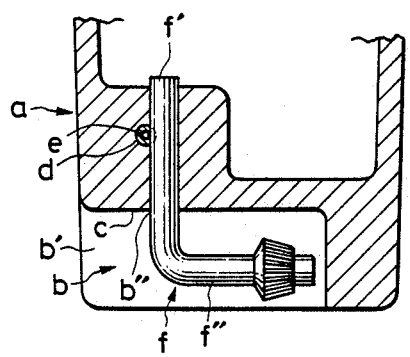
FIG. 7
PRIOR ART

ELECTRIC DRILL'S CHUCK KEY HOLDING DEVICE

BACKGROUND OF THE INVENTION

1. Field of the Invention

This invention relates to electric drills, and more particularly to a chuck key holding device in an electric drill.

2. Background of the Invention

A conventional holding device for holding the chuck key of an electric drill is as shown in FIG. 7. The key is a wrench or handle used to tighten or loosen the chuck of the drill. A recess b' is formed in the side wall of a drill body a. An inserting hole b" is formed in the bottom wall c of the recess b' in such a manner that it is extended perpendicular to the bottom wall of the recess b' to form a key receiving section b. A hole d is formed in the side wall of the drill body in a such a manner that it opens into the inserting hole b" and is perpendicular to inserting hole b". A cylindrical rubber member e is inserted into the hole d in such a manner that part of it appears in the inserting hole b". Under this condition, the grip f' of an L-shaped key f is inserted into the inserting hole b", and the remaining part f" of the L-shaped key f (hereinafter referred to as "a gear part") are inserted into the recess b'. As a result, the key f is held in the key in the key receiving section b with the rubber member e.

Chuck key holding devices for an electric drill are disclosed in Japanese Utility Model Publication No. 58-17689 and Japanese Utility Model Application Publications Nos. 53-96287, 53-153585, and 54-37589.

However, the conventional electric drill's chuck key holding device is disadvantageous in the following points. Since the inserting hole b" for receiving the grip f' of the key f must extend a long distance in the wall of the drill body a, the chuck key holding device needs a relatively large space. That is, its position is limited. More specifically, it is impossible to provide the device in the upper part of the drill body which is the ideal position because the chuck key will not obstruct the drilling operation if provided there. Furthermore, as the recess b' has a large opening in the surface of the drill body, it spoils the external appearance of the electric drill.

SUMMARY OF THE INVENTION

Accordingly, an object of this invention is to eliminate the above-described difficulties accompanying a conventional electric drill's chuck key holding device.

More specifically, an object of this invention is to provide a chuck key holding device for an electric drill which requires a relatively small space in the drill body, thus permitting the free operation of the drill without spoiling the external appearance of the drill, and in which a chuck key can be detachably mounted and can be positively held.

Another object of the invention is to provide an electric drill chuck key holding device which can be formed at relatively low cost.

The foregoing objects and other objects of the invention have been achieved by the provision of an electric drill's chuck key holding device, which, according to the invention, includes a substantially L-shaped chuck key receiving groove including a first recess for receiving the gear part of a chuck key. The first recess is formed in the upper junction of two half-housings which are joined with bolts or the like to form a drill body in such a manner that the first recess is extended substantially perpendicular to the upper junction. A second recess receives the grip part of the chuck key, the second recess being formed in the upper portion of one of the half-housings in such a manner that the second recess is extended from one end of the first recess and is substantially perpendicular to the first recess. A chuck key setting rubber member is provided in one side wall of the first recess which is opposite to the other side wall on the side of which the second recess is extended in such a manner that the rubber member is protruded in the first recess. A chuck key securing rubber member provided in the inner side wall of the second recess in such a manner that the rubber member is protruded in the second recess.

The nature, principle and utility of the invention will become more apparent from the following detailed description when read in conjunction with the accompanying drawings.

BRIEF DESCRIPTION OF THE DRAWINGS

FIGS. 5(a) and 5(b) are sectional views for a description of a method of inserting a chuck key securing rubber member in the recess formed in the drill body;

FIG. 6 is a side view showing a part of another example of the electric drill's chuck key holding device according to the invention; and FIG. 7 is a sectional view showing a conventional electric drill's chuck key holding device.

DETAILED DESCRIPTION OF THE PREFERRED EMBODIMENTS

A first example of an electric drill's chuck key holding device according to this invention will be described with reference to FIGS. 1 through 5.

Figure 1:
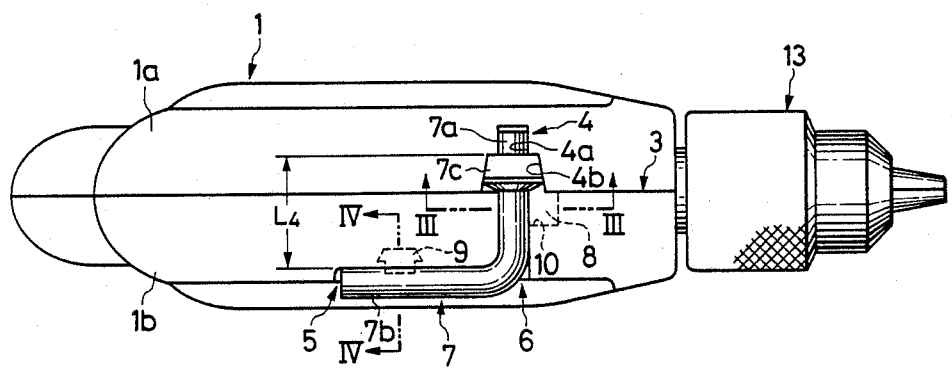
FIG. 1 is a plan view showing one example of an electric drill's chuck key holding device according to this invention.
Figure 2:
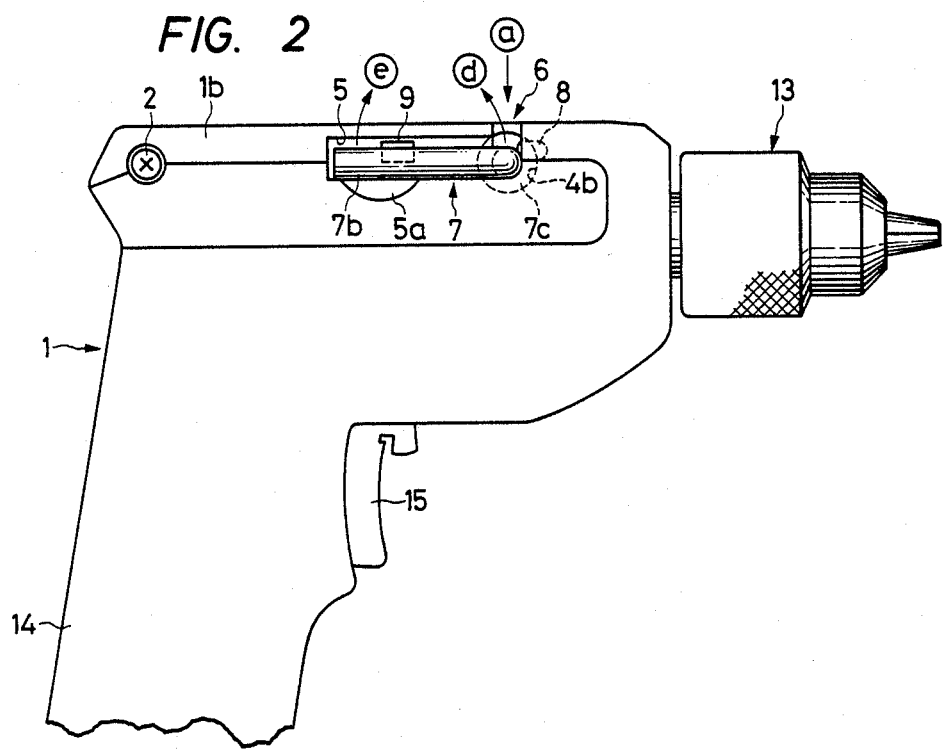
FIG. 2 is a side view of the electric drill's chuck key holding device shown in FIG. 1.

As shown in FIG. 1, a drill body 1 is formed by joining two half-housings 1a and 1b together with bolts 2 (FIG. 2) or the like. The electric drill includes, as shown in FIGS. 1 and 2, a chuck 13, for which the chuck key is used, a handle 14 and a hand switch 15. A gear recess or outwardly transverse groove 4 is formed in the upper portion of the drill body 1 in such a manner that it is extended in the two half-housings 1a and 1b across their junction plane 3 and is perpendicular to the junction plane 3 and includes a radially enlarged portion 4b so as to receive a gear part 7a of a chuck key 7. A grip recess or outwardly open longitudinal groove 5 for receiving a grip part 7b of the key 7 is formed in the upper portion of the half-housing 1b extending along the side of said half-housing 1b at the upper portion thereof, opening in the same direction as groove 4, and intersecting at one end thereof the end of said first, transverse groove 4 to the same side thereof in such a manner that it is communicated with the gear recess 4 and is perpendicular to the gear recess 4. That is, the two recesses 4 and 5 form a substantially L-shaped upwardly and outwardly open key receiving groove 6 on the periphery of the drill body 1 which can receive the chuck key 7.

The chuck key 7 is L-shaped, i.e., it is formed by bending a round rod and forming one end portion into the gear part 7a with a gear 7c. The other end portion is utilized as it is, i.e., it is the grip part 7b. Therefore, in the key receiving groove 6, the gear recess 4 is made up of a small-width outwardly open channel 4a whose width corresponds to the diameter of the round rod and a large-width outwardly open channel 4b which is formed in the small-width channel 4a in such a manner that it is coaxial with the channel 4a and is of a width so it can receive the radially enlarged gear 7c of the chuck key 7. The grip recess 5 is formed in the drill body 1 in such a manner that it is extended longitudinally of the drill body 1 and is wide enough to receive the grip part 7b of the chuck key 7. The narrow width of the gear recess 4 at the junction plane 3 serves to stop the movement of the gear 7 toward the grip recess 5. An additional finger recess 5a for receiving the finger tip is formed in the drill body 1 in such a manner that it is extended from the grip recess 5.

Figure 3A:
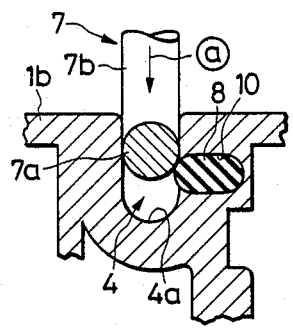
FIGS. 3(a), 3(b) and 3(c) are enlarged sectional views taken along line III—III in FIG. 1 and FIGS. 4(a) and 4(b) are also enlarged sectional views taken along IV—IV in FIG. 1, for a description of a method of holding the chuck key.
Figure 3B:
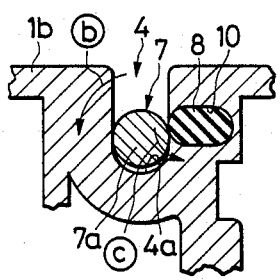
Figure 3C:
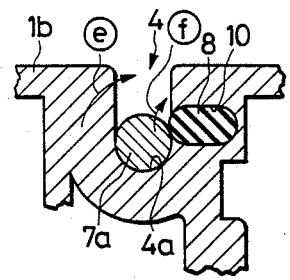
Figure 4A:
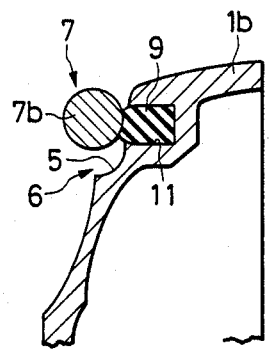
Figure 4B:
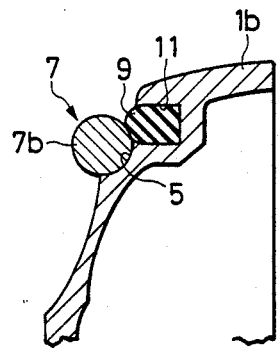

In the gear recess 4 forming the key receiving groove 6, a chuck key setting rubber member 8, illustrated in details in FIGS. 3(a)-3(c), is fixed in the one side wall of the gear recess 4 which is opposite to the other side wall on the side of which the grip recess 5 is formed in such a manner that the rubber member 8 slightly protrudes into the gear recess 4. On the other hand, a chuck key securing rubber member 9, illustrated in detail in FIG. 4(a) and 4(b), is fitted in the half-housing 1b is such a manner that slightly protrudes into the grip recess 5. That is, the gear part 7a of the chuck key 7 is held in the gear recess 4 by means of the chuck key setting rubber member 8 while the grip part 7b of the chuck key 7 is secured in the grip recess 5 by means of the chuck key securing rubber member 9, so that the chuck key 7 is detachably held in the chuck key receiving groove 6.

As illustrated in FIGS. 3(a)-3(c), the chuck key setting rubber member 8 is elliptical in section. A rubber member receiving hole 11 is formed in the half-housing 1b in such a manner that it opens into the junction surface of the housing 1b and faces one side of the recess 4. The chuck key setting rubber member 8 is press-fitted into the hole 11 or fixed in the hole 11 with adhesive in such a manner that it slightly protrudes into the recess 4, as illustrated in FIG. 1.

On the other hand, as illustrated in FIGS. 5(a) and 5(b) the chuck key securing rubber member 9 is preferably wedge-shaped at one end and has engaging steps 9a and 9b at both sides. The securing rubber member 9 is forcibly inserted against its elastic force into the mounting hole 11 formed in the half-housing 1b so that the engaging steps 9a and 9b of the securing rubber member 9 are fixedly engaged with the right and left edges 11b and 11a of the mounting hole 11. In this case, adhesive may be applied to the securing rubber member 9 if necessary. As was described before and as is illustrated in FIGS. 4(a) and 4(b), the chuck key securing rubber member 9 is slightly protruded in the recess 9 so as to positively hold the grip part 7b of the chuck key 7.

FIG. 6 shows another example of the electric drill's chuck key holding device according to the invention. In this example, the chuck key setting rubber member 8 of the first example is eliminated, and the chuck key 7 is held by the chuck key securing rubber member 9 only.

In this example, the movement of the chuck key 7 in the direction of the arrow e is prevented by the securing rubber member 9. The movement of the chuck key 7 in the direction of the arrow d is prevented as follows. The length $L_1$ of the securing rubber member 9 is set to a sufficiently large value and the width $L_2$ of the gear recess 4 is made substantially equal to the diameter of the gear part 7a of the chuck key 7 so that the distance $L_3$ between the center of the gear part 7a and the securing rubber member 9 prevents the rotation in the direction d of the chuck key 7. Thus, the chuck key 7 is positively held in the chuck key receiving groove 6. If a chuck key holding protrusion 8' is formed on the one side of the gear recess 4 as shown in FIG. 6, then the chuck key 7 can be more positively held in the chuck key receiving groove 6.

In the electric drill with the chuck key holding device thus constructed, the L-shaped chuck key 7 is put in the chuck key receiving groove 6 as follows. First, the grip part 7b of the chuck key 7 is held substantially vertical. Under this condition, the gear part 7a of the chuck key 7 is inserted into the gear recess 4 and moved in the direction of the arrow a until it abuts against the chuck key setting rubber member 8. The gear part 7a is further moved downwardly. In this operation, the rubber member 8 is elastically deformed, so that the gear part 7a is positively fitted in the gear recess 4 as shown in FIG. 3(b).

Under this condition, the grip part 7b of the chuck key 7 is turned in the direction of the arrow b. In this operation, the gear part 7a is moved in the direction of the arrow c so that it is more positively held in the recess 4.

When the grip part 7b of the chuck key 7 passes over the chuck key securing rubber member 9, the grip part 7b compresses the rubber member 9 as shown in FIG. 4(a). Thereafter, the securing rubber member 9 thus elastically deformed is restored in configuration, so that the grip part 7b of the chuck key 7 is held in the recess 5.

The chuck key 7 has some error in the production dimension $L_4$. However, the error can be absorbed by the elastic deformation of the chuck key securing rubber member 9.

When the chuck key 7 is received in the chuck key receiving groove as described above, the movement of the chuck key 7 in the direction of the arrow d is prevented by the chuck key setting rubber member 8 while the movement of the chuck key 7 in the direction of the arrow e is prevented by the chuck key securing rubber member 9.

The chuck key can be removed from the chuck key receiving groove as follows. The grip part 7b of the chuck key 7 is turned in the direction of the arrow e with the finger tip inserted into finger recess 5a. As a result, the securing rubber member 9 is elastically deformed so that the grip part 7b is disengaged from the securing rubber member 9 and then the setting rubber member 8 is pushed in the direction of the arrow f. Thus, the chuck key 7 can be readily removed from the chuck key receiving groove 6.

The chuck key holding device of the invention is constructed as described above. Therefore, the chuck key 7 can be held in the wall of the drill body 1, which facilitates the operation of the chuck. Furthermore, since the groove 6 is employed for receiving the chuck key 7, the chuck key receiving space is smaller than the conventional chuck key receiving space, and therefore the chuck key receiving groove 6 can be formed in the upper portion of the drill body 1 where the drill operation is not obstructed by the chuck key.

When the chuck key 7 is inserted into the chuck key receiving groove 6, first the gear part 7a is inserted into the gear recess 4, and then the grip part 7 is turned, so that the gear part 7a is moved so as to be more stably held in the gear recess 4 while elastically deforming the chuck key setting rubber member 8. Thus, the disengagement of the gear part 7a from the groove is prevented by the chuck key setting rubber member 8, while the disengagement of the grip part 7b is prevented by the chuck key securing rubber member 9. That is, the chuck key is positively held in the chuck key receiving groove 6.

As was described above, even if the chuck key 7 has an error in its dimensions, the error can be absorbed by the chuck key securing rubber member 9. That is, even a chuck key having a dimensional error can be stably held in the chuck key receiving groove 6.

When the grip part 7b of the chuck key 7 is swung upwardly to disengage form the chuck key securing rubber member 9, the gear part 7a deforms the chuck key setting rubber member 8 to disengage from the chuck key setting rubber member 8. As a result, the chuck key 7 can be readily removed form the chuck key receiving groove 6.

Furthermore, as the chuck key does not protrude out of the chuck key receiving groove when held therein, the external appearance of the drill body 1 is not spoiled by holding the chuck key in the chuck key receiving groove.

In addition, the electric drill's chuck key holding device according to the invention, being simple in construction, can be formed at relatively low manufacturing cost.

What is claimed is:

1. A chuck key holding device in a rotary tool, for holding an L-shaped chuck key including an L-shaped rod forming one leg having thereon a radially enlarged gear part, and a second leg forming a grip part of said chuck key, said tool comprising:

two half housings joined together along a junction plane to form a tool body having a top and laterally opposite sides; said chuck key holding device comprising:

a first recess or receiving a gear part of a chuck key, said first recess being formed in said two half housings perpendicular to and crossing said junction plane; said first recess being in the form of transverse groove opening upwardly to the periphery of the tool body and having a radially enlarged portion intermediate of the ends thereof for receiving said gear part of said chuck key;

a second recess for receiving said grip part of said chuck key, said second recess being formed in one of said half housings extending longitudinally along said tool body intersecting said first recess and being substantially perpendicular to said first recess; said second recess consisting of a longitudinal groove opening upwardly in the same direction as said transverse groove and intersecting at one end, said transverse groove at one of said sides of said tool body;

a first elastic member protruding into said second recess for elastically holding said grip part against a surface of said second recess, and a second elastic member protruding into said first recess from a wall of said first recess in the opposite direction to which said second recess extends whereby, said one leg and said gear part of said chuck key is resiliently secured in said first recess by inserting said one leg into said recess past said second elastic member and said chuck key is rotated about the axis of said one leg until said second leg moves into said second recess past said first elastic member.

2. A holding device as recited in claim 1, wherein said first recess includes a first portion in the other of said half housings accommodating a gear portion of said gear part and a second portion in said one half housing closely accommodating a rod portion of said gear part intermediate said gear portion and said grip part.

3. A holding device as recited in claim 2, wherein said first elastic member protrudes into said second recess away from said junction plane.

4. A holding device as recited in claim 3, wherein said second recess also opens to one said side of said tool body away from said junction plane.

5. A holding device as recited in claim 4, further comprising a third recess extending longitudinally along a portion of said second recess on a side away from a surface of said tool including said junction plane.

6. A holding device as recited in claim 4, wherein said two half housings form a handle for manually holding said tool and wherein a surface of said tool including said junction plane is on a side of said tool opposite said handle.

* * * * *